(12) United States Patent
Arns et al.

(10) Patent No.: US 7,407,206 B2
(45) Date of Patent: Aug. 5, 2008

(54) BUMPER STRUCTURE FOR A MOTOR VEHICLE

(75) Inventors: Wilhelm Arns, Paderborn (DE); Sven-Lars Rotzoll, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 101 days.

(21) Appl. No.: 11/294,100

(22) Filed: Dec. 5, 2005

(65) Prior Publication Data
US 2006/0125254 A1    Jun. 15, 2006

(30) Foreign Application Priority Data
Dec. 13, 2004    (DE) .................... 10 2004 060 088

(51) Int. Cl.
  *B60R 19/34* (2006.01)
(52) U.S. Cl. ...................... 293/133; 293/155
(58) Field of Classification Search .............. 293/133, 293/155
  See application file for complete search history.

(56) References Cited

U.S. PATENT DOCUMENTS 5,005,887 A * 4/1991 Kelman ........................ 293/120
6,364,384 B1 * 4/2002 Kemp et al. .................. 293/120
6,918,621 B2 * 7/2005 Seksaria ...................... 293/133
2004/0046404 A1 * 3/2004 Kim ............................. 293/133

FOREIGN PATENT DOCUMENTS

| DE | 43 22 353 A1 | 1/1995 |
| DE | 298 08 143 U1 | 9/1998 |
| EP | 1 219 499 A1 | 7/2002 |
| GB | 2 295 993 A | 6/1996 |
| GB | 2 299 551 A | 10/1996 |
| JP | 11 208392 A | 8/1999 |

* cited by examiner

*Primary Examiner*—Dennis H Pedder
(74) *Attorney, Agent, or Firm*—Henry M. Feiereisen; Ursula B. Day

(57) ABSTRACT

A bumper structure for a motor vehicle includes a cross member, and a crash box placed between the cross member and a longitudinal member, with the crash box having an attachment zone. Bolts extend through walls of the attachment zone and the longitudinal member for securing the crash box to the longitudinal member by forcing the attachment zone against the wall of the longitudinal member. The attachment zone undergoes hereby locally an elastic or plastic deformation for realizing a self-centered disposition of the crash box in relation to the longitudinal member. The walls of the attachment zone and the longitudinal member extend at a tolerance distance before the crash box is secured to the longitudinal member.

16 Claims, 6 Drawing Sheets

BUMPER STRUCTURE FOR A MOTOR VEHICLE

CROSS-REFERENCES TO RELATED APPLICATIONS

This application claims the priority of German Patent Application, Ser. No. 10 2004 060 088.0, filed Dec. 13, 2004, pursuant to 35 U.S.C. 119(a)-(d), the subject matter of which is incorporated herein by reference.

BACKGROUND OF THE INVENTION

The present invention relates, in general, to a bumper structure for a motor vehicle.

Nothing in the following discussion of the state of the art is to be construed as an admission of prior art.

A standard bumper structure is typically mounted on the front or rear of a motor vehicle between the plastic shell construction, which encloses the vehicle body, and the body-supporting structure or chassis of the motor vehicle, and includes a cross member for connection to two longitudinal members of the chassis. To prevent damage to the vehicle structure in the event of a frontal or rear impact at low speed, crumpling or deformation elements, called crash boxes, are arranged between the longitudinal members and the cross member. Crash boxes are thin-walled, normally rectangular elements of steel, aluminum or plastic, and can be manufactured by joining compressed sheet-metal shells or by shaping a single-piece element, e.g. an extruded aluminum section. In the event of an impact, the crash boxes convert the generated kinetic energy into deformation work to prevent permanent damage to the longitudinal members when a critical stress level has been exceeded.

There are many ways to secure the crash boxes to the longitudinal members. Crash boxes may be supported by flanged plates mounted to the end surface of the longitudinal member. The region of the longitudinal member has also an attachment zone to enable a threaded engagement between the components. Thus, there is a need for arrangement of a respective flange. This type of attachment of the crash box requires therefore the provision of additional components so that the overall weight of the motor vehicle is increased.

German utility model no. DE 298 08 143 U1 describes a securement of crash boxes to the longitudinal members on the side by means of transverse bolts. Like the afore-described support of the crash boxes on the end surface of the longitudinal members, this construction too requires increased installation space.

Regardless of the type of attachment of the crash box to the longitudinal member, the provision of tolerance compensating elements, in particular in the form of oblong holes, is necessary. These tolerance compensating elements are normally provided in the flanged plates. Installing crash boxes without flanged plates requires a tolerance compensation between the cross member and the crash box, using complex threaded engagements.

It would therefore be desirable and advantageous to provide an improved bumper structure which obviates prior art shortcomings and is compact and lightweight so as to utilize the available installation space upon the longitudinal members in an optimum manner while reliably compensating tolerances in the attachment zone between the longitudinal members and the crash boxes.

SUMMARY OF THE INVENTION

According to one aspect of the present invention, a bumper structure for a motor vehicle includes a cross member, a crash box placed between the cross member and a longitudinal member and having an attachment zone, and fastening means, extending through walls of the attachment zone and the longitudinal member, for securing the crash box to the longitudinal member by forcing the attachment zone against the wall of the longitudinal member, while the attachment zone undergoes locally an elastic or plastic deformation for realizing a self-centered disposition of the crash box in relation to the longitudinal member, wherein the walls of the attachment zone and the longitudinal member extend at a tolerance distance relative to one another before the crash box is secured to the longitudinal member.

The present invention resolves prior art problems by directly securing the crash box to the longitudinal member without intervention of flanged plates. This results in desired weight saving. The crash box is constructed for nominal spacing in relation to the cross section profile of the longitudinal member so as to be securable to the longitudinal member in the presence of encountered tolerances by undergoing, at least locally, an elastic or plastic deformation. The fastening means, e.g. bolts, for securing the attachment zone of the crash box to the longitudinal member bridge hereby a generously sized tolerance distance between the walls of the attachment zone and longitudinal member and urge the wall of the crash box against the wall of the longitudinal member. During assembly, the cross member assumes jointly with the crash box a predefined position which is precisely maintained as the crash box self-centers in relation to the longitudinal member. Self-centering eliminates the need for oblong holes that are difficult to produce in the longitudinal member or in crash boxes. As a result of the particular configuration of the attachment zone, which is able to locally undergo an elastic or plastic deformation during installation, the spatial position of the crash box remains unchanged as the bolts are tightened. The tolerance distance between the walls of the attachment zone and the longitudinal member is intentionally dimensioned greater than would be possible to manufacture so as to permit a slight transverse movement of the cross member with crash boxes transversely to the vehicle length axis. The crash box can be firmly mounted to the cross member. No complicated adjustments in the attachment zone between the crash box and the cross member are thus required. This, too, reduces weight and simplifies installation. A bumper according to the present invention comprised of the cross member with accommodated crash boxes can thus form a very lightweight structure which can be easily and rapidly assembled.

According to another feature of the present invention, the crash box may be comprised of two half-shells which are connected to one another only in an area outside the attachment zone. In other words, the half-shells are not joined in the area of the attachment zone. As a result, the half-shells can easily be deformed relative to one another in the area of the attachment zone. Thus, stress peaks are slight, and the torque to tighten the bolts is low so that the installation is simple.

When the crash box is of single-piece configuration, for example in the form of a hollow section, length slots may be formed in the wall of the attachment zone so as to define attachment tongues to thereby provide the wall with elastic or plastic deformation capability. Of course, crash boxes, made by joining half-shells, may be formed with length slots as well to enhance elasticity and thus attachment capability to the longitudinal member. The length slots extend to the end surfaces of the attachment zone and may be provided in particular in a corner area of the crash box. Thus, a rectangular profile for example, may have four independently deformable attachment tongues which can be urged against the wall of the longitudinal member to bridge the predefined tolerance distance, without adversely affecting the other attachment tongues.

According to another feature of the present invention, the attachment zone may be disposed in surrounding relationship to the longitudinal member. In this way, the crash box is placed over the longitudinal member. Of course, the attachment zone may also be pushed into the longitudinal member, whereby In this case, the crash box engages into the longitudinal member. Depending on the disposition of the crash box in relation to the longitudinal member, the walls of the attachment zone are either pushed from outside against the outer surfaces of the longitudinal member or, when the crash box is received within the longitudinal member, are drawn from inside to outside and pressed against the inside surfaces of the longitudinal member.

According to another feature of the present invention, the half-shells of the crash box may have marginal webs which are connected to one another to define flanges and the longitudinal member may be made of two half-shells which also have marginal webs connected to one another to define flanges. In this case, the webs of the crash box extend in the attachment zone at a distance to one another and surround the flanges of the longitudinal member with the tolerance distance. The webs of the crash box embrace hereby the flanges of the longitudinal member, while maintaining the tolerance distance. When a desired assembly position has been realized, the bolts which extend through the flanges of the longitudinal member and the webs of the crash boxes can be tightened to center the crash box in relation to the longitudinal member. The spaced-apart webs of the crash box thus serve quasi as length slot in the attachment zone so that the half-shells of the crash box become more flexible and easier to deform in the attachment zone with the longitudinal member.

According to another feature of the present invention, the cross member may have a hat-shaped cross section with a center plate which is recessed in a direction of the crash box and terminates in angled legs, wherein the half-shells of the crash box have marginal webs which are connected to one another to define flanges for connection to the legs. The attachment of the crash box to the cross member is thus realized also via the marginal webs and not via box-shaped center parts of the crash box. The hat-shaped profile enhances bending resistance of the cross member and extends therefore typically over the entire length of the cross member. Unlike the support of box-shaped center parts of crash boxes on the center webs of the cross member, the webs of the crash boxes according to the present invention extend beyond the end surfaces of their respective center parts up to the legs so that the legs provide additional reinforcement and support that positively affects the deformation behavior of the crash box. The flange in the shape of a shell construction of the crash box is suitably welded to the cross member. The need for additional sheet-metal bulkheads is eliminated.

The particular configuration of the attachment zone enables to size the tolerance distance in the attachment zone with the longitudinal member significantly greater than would normally be permittable. The tolerance distance may be greater than a wall thickness of the attachment zone. The term "tolerance distance" relates hereby to the distance between the walls to be connected in the overlap zone, when the crash box is positioned absolutely centered in relation to the longitudinal member. In the event, the crash box bears upon the wall of the longitudinal member before being bolted, a tolerance distance is established on the opposite side of the crash box which tolerance distance is twice the size of the wall thickness of the attachment zone for example. The attachment zone is hereby constructed such that also in this extreme case, the tolerance distance can be bridged as the bolts are sized long enough to match the tolerance distance.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
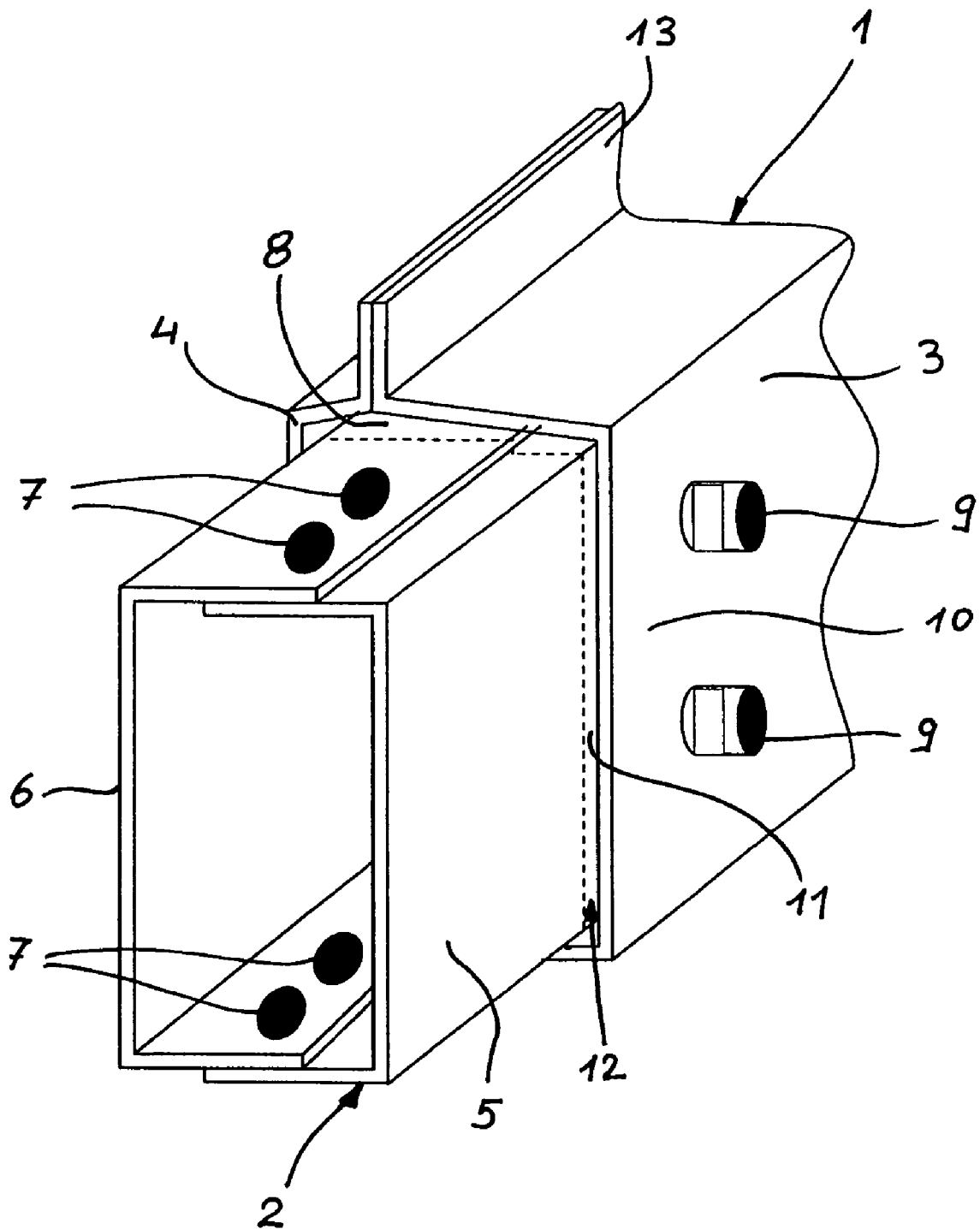
FIG. 1 is a perspective view of a longitudinal member of a motor vehicle in connection with an inserted crash box of a bumper structure according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view of a longitudinal member 1 of an otherwise unillustrated motor vehicle in connection with a crash box 2 of a bumper structure according to the present invention. The longitudinal member 1 as well as the crash box 2 is manufactured in the shape of a shell construction. The longitudinal member 1 is hereby made of two half-shells 3, 4, whereas the crash box 2 is made of two half-shells 5, 6 which are configured of U-shape and joined together to form a box-shaped hollow member. Overlapping legs of the half-shells 5, 6 on top and bottom of the hollow member are welded together at welding spots 7, shown only symbolically to indicate that an attachment zone 8 of the crash box 2, provided for engagement into the longitudinal member 1, is devoid of such welding spots. Thus, the half-shells 5, 6 are not joined together in the area of the attachment zone 8.

The crash box 2 is bolted to the longitudinal member 1 via bolts 9 which extend through the wall 10 of the longitudinal member 1 as well as through wall 11 of the crash box 2. As indicated by the broken line, projected upon the crash box in the end surface of the longitudinal member 1, a tolerance distance 12 is provided between the walls 10, 11. The tolerance distance 12 is provided all-around between the walls 10, 11 of the longitudinal member 1 and crash box 2, i.e. also on the opposite side which is invisible in FIG. 1 as well as between the walls on the underside and top side. As the attachment zone 8 is devoid of welding spots 7, the walls 11 of the crash box 2 can be drawn against the inside of the wall 10 of the longitudinal member 1, as the bolts 9 are tightened. Although not shown in detail, further bolts 9 are provided in symmetrical disposition on the opposite side of the longitudinal member 1 as well so that the spatial position of the crash box 2 in relation to the longitudinal member 1 is maintained, when the bolts 9 are tightened at the same time, and the crash box 2 can be secured in centered alignment inside the longitudinal member 1.

Figure 2:
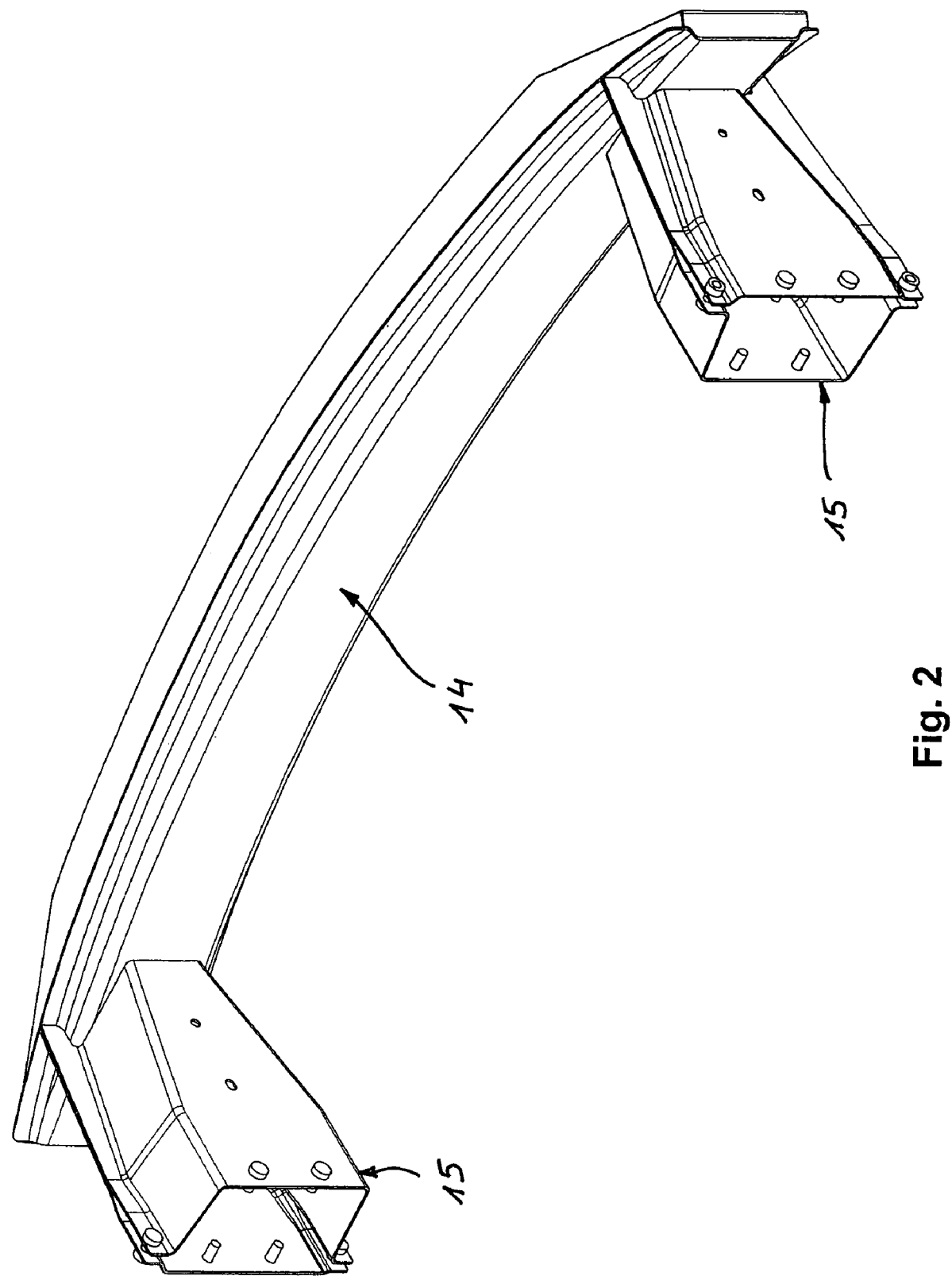
FIG. 2 is a perspective view of a bumper structure according to the present invention.
Figure 3:
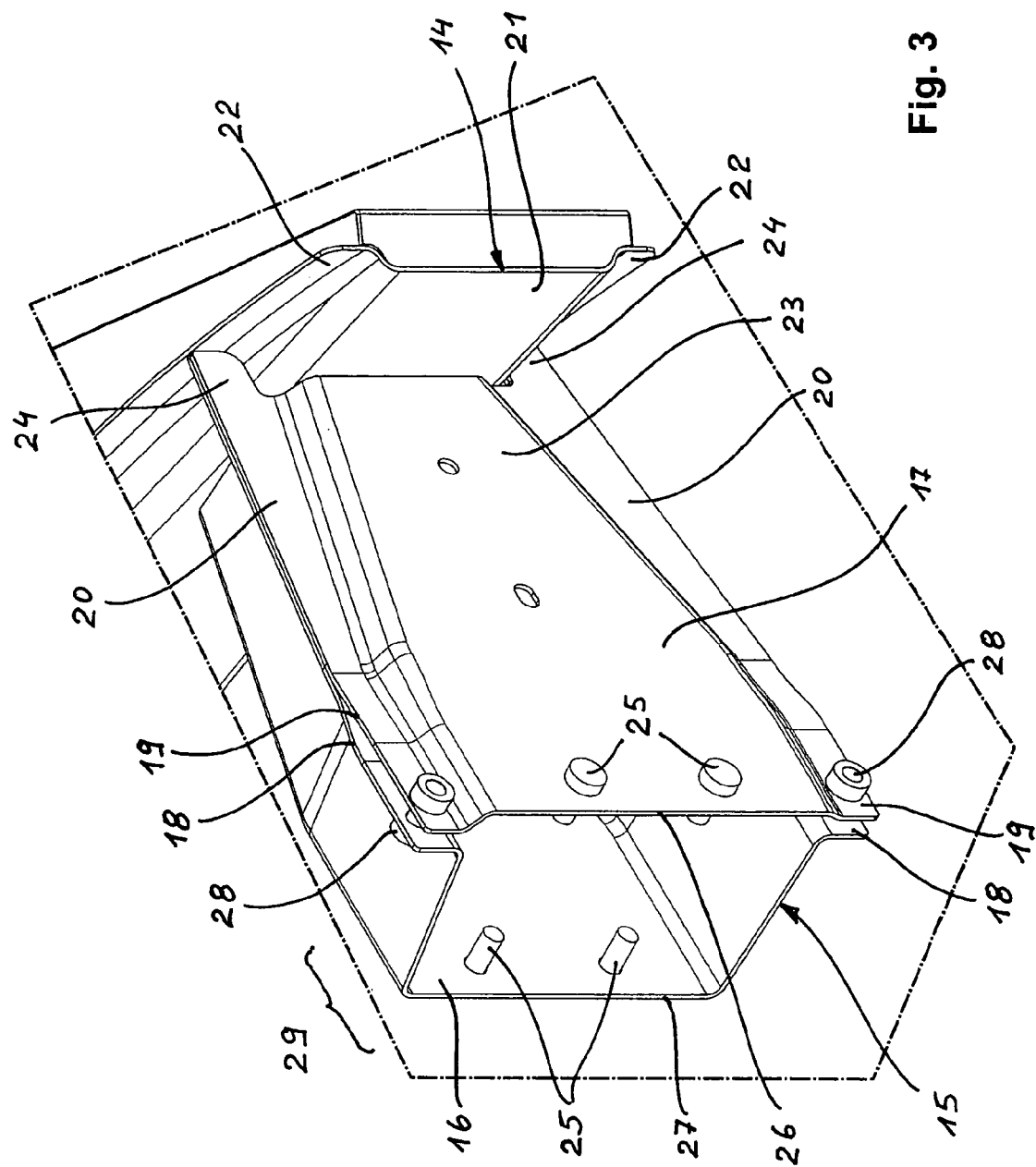
FIG. 3 is an enlarged detailed view of a crash box of FIG. 2.

Referring now to FIG. 2, there is shown a perspective view of a bumper structure according to the present invention including a cross member 14 of generally hat-shaped configuration, and two crash boxes 15 respectively welded to opposite ends of the cross member 14. The crash boxes 15 are made in the shape of a shell construction. FIG. 3 shows in greater detail, on an enlarged scale, the crash box 15 on the right-hand side in FIG. 2. The crash box 15 includes a half-shell 16 and a half-shell 17 which are both formed with upper and lower marginal webs 18, 19 joined together to form respective flanges 20. The flanges 20 extend off-center as the half-shell 16 has a substantially U-shaped cross section, whereas the half-shell 17 is more of a C-shaped configuration and thus is defined by a lesser depth to serve as end plate.

The crash box 15 is welded to the cross member 14 which is formed with a center plate 21 recessed in the direction of the crash box 15 and terminating in angled legs 22. The crash box 15 has a box-shaped center part 23 which has a vertical height increasing in the direction toward the longitudinal member 1 and tapers trapezoidally in the direction towards the cross member 14 so that the center part 23 is supported only by the center plate 21 of the cross member 14. The marginal flanges 20 of the crash box 15 become increasingly wider in the direction towards the cross member 14 as the height of the center part 23 decreases, and reach a maximum in the area of the center plate 21 of the cross member 14. In the example of FIG. 3, the flanges 20 are constructed to extend beyond the center plate 23 to abut against the legs 22 of the cross member 14. Suitably, the projecting ends 24 of the flanges 20 are welded to the legs 22 for additional stiffening of the bumper structure. The ends 24 conform to the rear contour of the cross member 14 and in particular to the radii in the transition area of center plate 21 and legs 22. As a result, the flanges 20 can be welded over the entire contact area with the cross member 14.

The crash box 15 is intended for placement over the unillustrated longitudinal member 1. In other words, the crash box 15 surrounds the longitudinal member 1 from outside. After positioning the crash box 1 over the longitudinal member 1, bolts 25 are placed in aligned bores of corresponding walls 26, 27 of the half-shells 16, 17 and the longitudinal member 1. Further bolts 28 extend through the flanges 20 to connect the parallel webs 18, 19 in an area of attachment zone 29. As described in conjunction with FIG. 1, the half-shells 16, 17 of the crash box 15 are not connected to one another in the area of the attachment zone 29 but are only joined firmly together in the area where the webs 18, 19 abut one another to form the flange 20. Formed between the attachment zone 29 and the flange 20 is a transition zone where the distance between the webs 18, 19 increases to the predefined spacing. As a result, a wedge-shaped gap is established which is widened to the predefined tolerance, i.e. the desired distance between the webs 18, 19.

Figure 4:
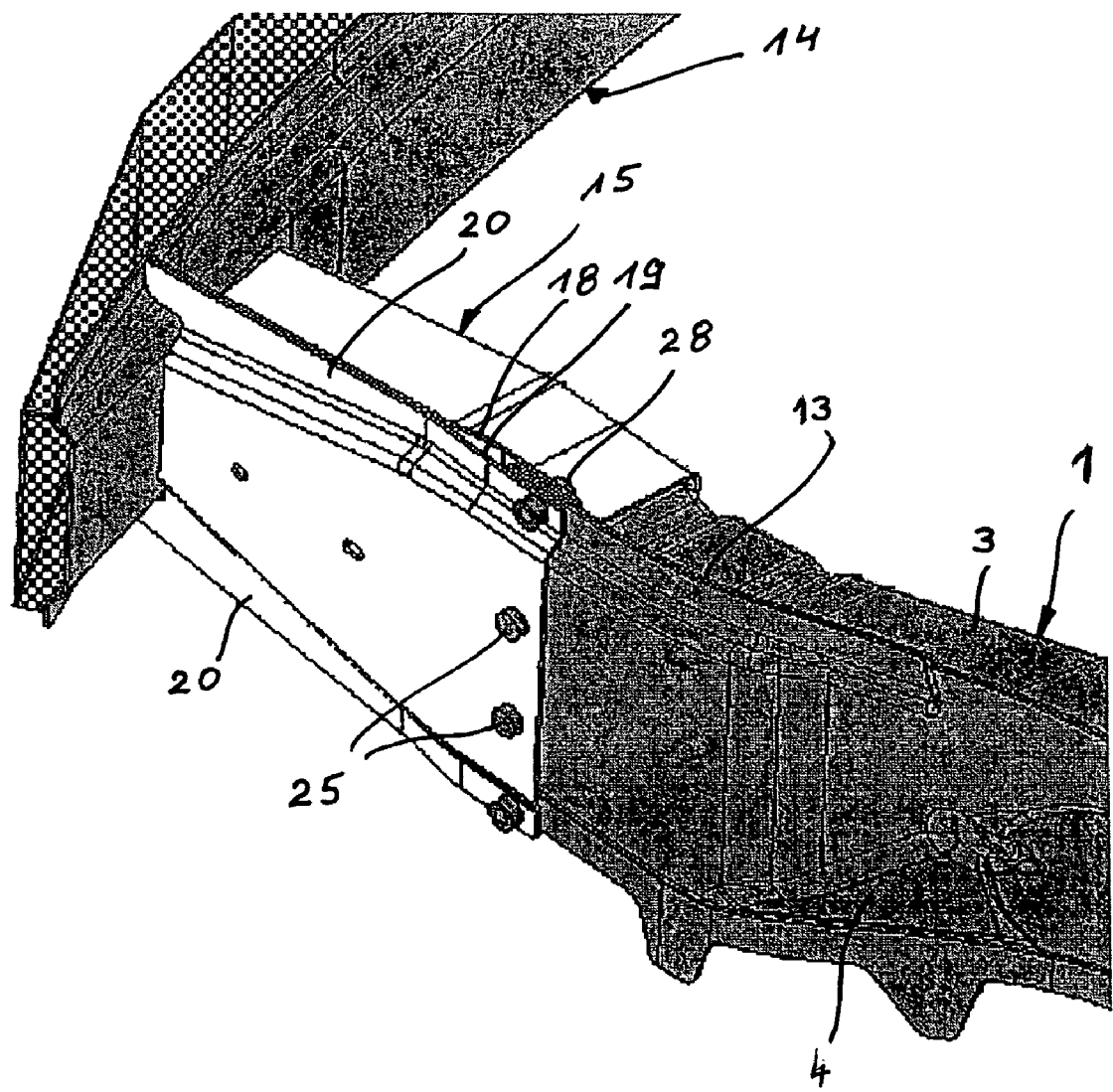
FIG. 4 is a perspective view of the bumper structure of FIG. 2 attached to a longitudinal member.

Turning now to FIG. 4, there is shown a perspective view of the bumper structure of FIG. 2 with the crash box 15 attached to the longitudinal member 1. Both, the longitudinal member 1 and the crash box 15 are made of half-shells 3, 4 and 16, 17, respectively, to form respective hollow members. The longitudinal member 1 has marginal webs 33, 34 connected to one another to form a flange 13. During assembly, the flange 13 of the longitudinal member 1 engages between the spaced-apart webs 18, 19 of the crash box 15. Although not shown in detail, the flange 13 of the longitudinal member 1 is provided with a bore for receiving bolt 28 to attach the crash box 15.

Figure 5:
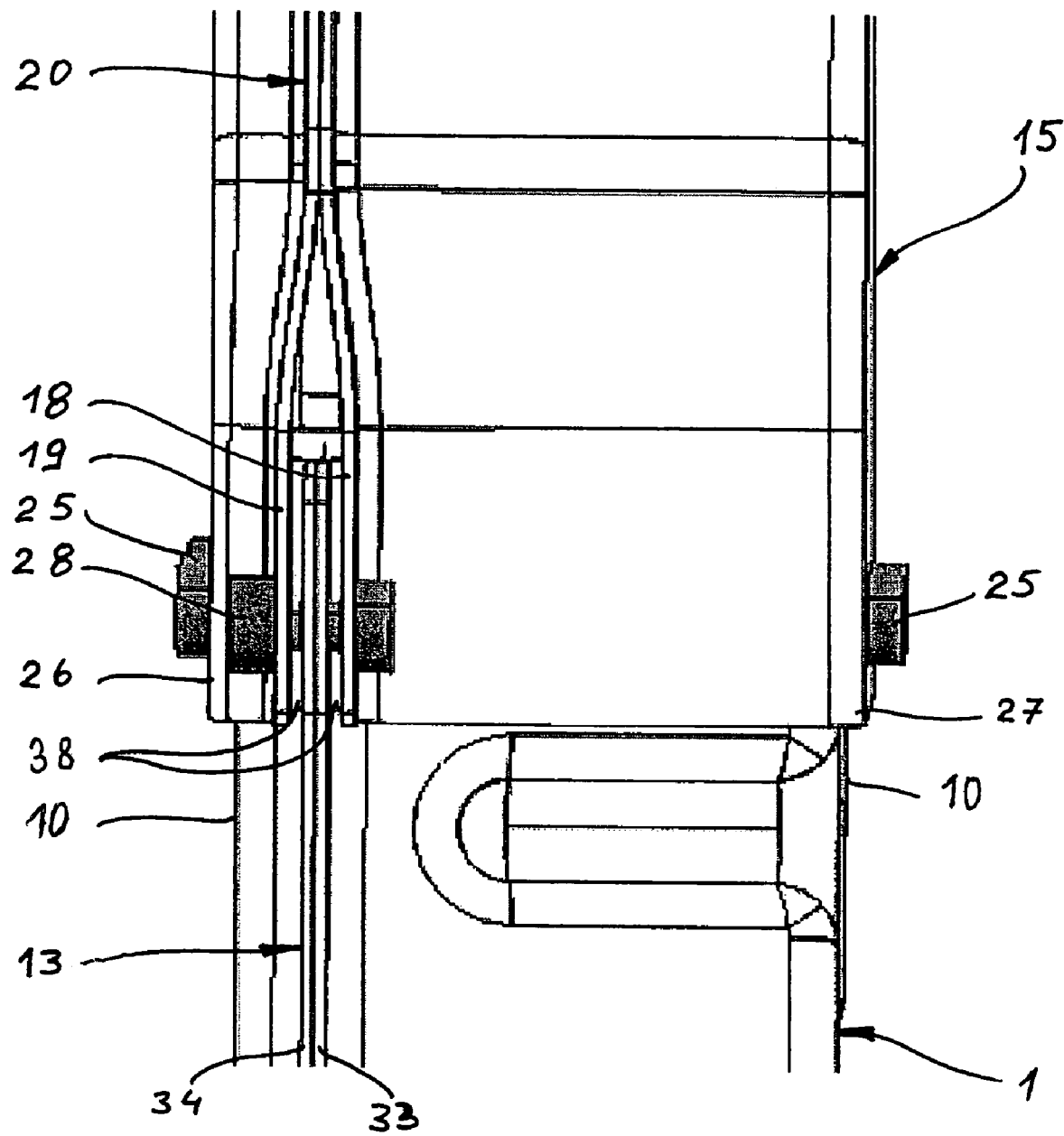
FIG. 5 is an enlarged detailed top view of the attachment zone of the crash box of FIG. 4.

As shown in FIG. 5, the distance between the webs 18, 19 of the crash box 15 is sized greater than a width of the flange 13 of the longitudinal member 1. The distance between the flange 13 and the adjacent web 18, 19 is designated as tolerance distance 38 which approaches zero as the bolts 25, 28 are tightened and the crash box 15, i.e. the webs 18, 19 and walls 26, 27 of half-shells 16, 17, undergoes an elastic or plastic deformation. The walls 26, 27 of the crash box 15 and the webs 18, 19 are pressed against the walls 10 and flange 13 of the longitudinal member 1 to thereby establish a firm connection between the crash box 15 and the longitudinal member 1 that allows the introduction of impact forces.

Figure 6:
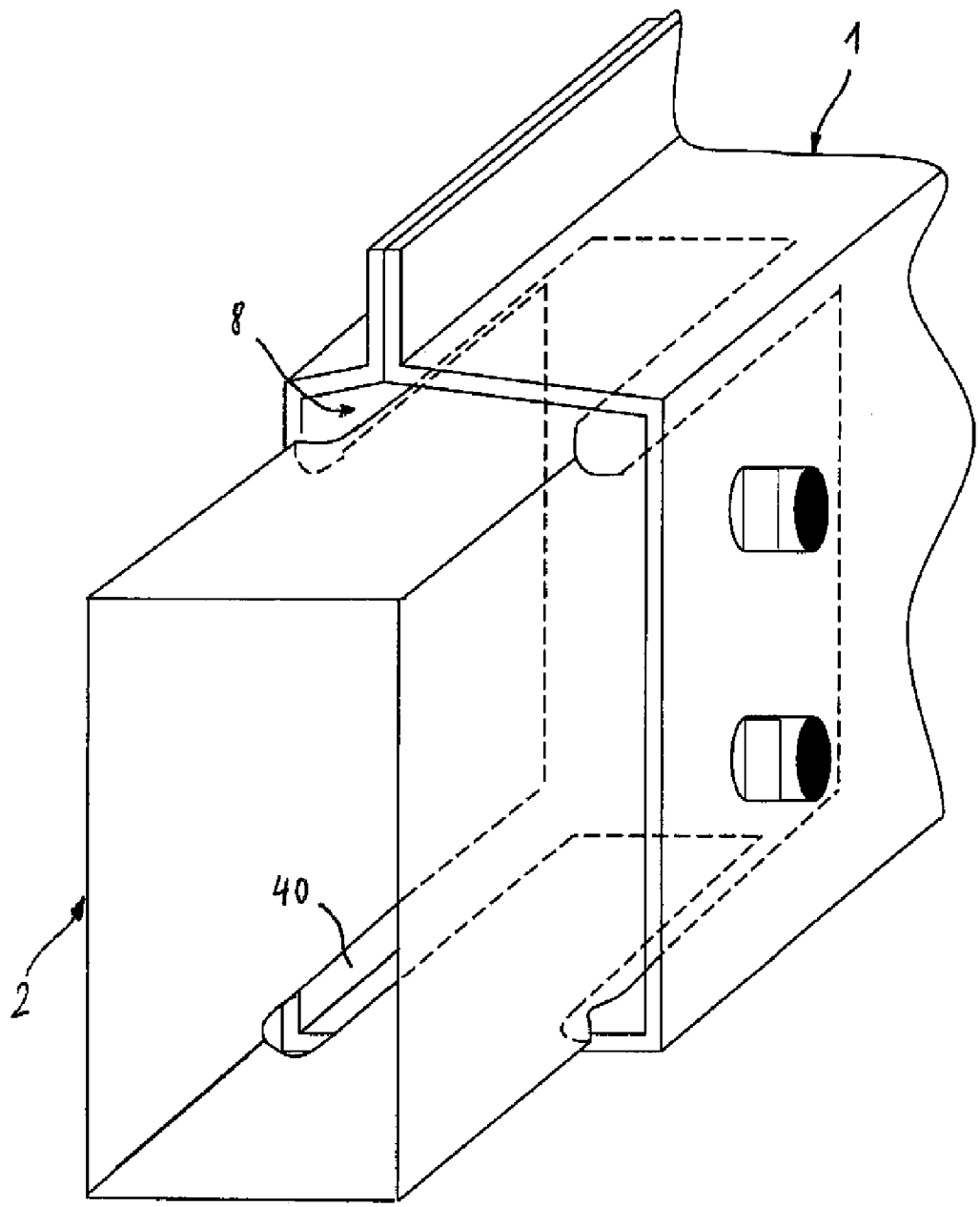
FIG. 6 is a perspective view of a longitudinal member of a motor vehicle in connection with an inserted crash box of a bumper structure according to a variation of the present invention.

When the crash box 2 is of single-piece configuration, for example in the form of a hollow section, as shown in FIG. 6, length slots 40 may be formed in the wall of the attachment zone 8 to thereby provide the wall with elastic or plastic deformation capability. Of course, crash boxes 2, made by joining half-shells, may be formed with length slots 40 as well to enhance elasticity and thus attachment capability to the longitudinal member 1. The length slots 40 extend to the end surfaces of the attachment zone 8 and may be provided in particular in a corner area of the crash box 2.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A bumper structure for a motor vehicle, comprising:
a cross member;
a crash box firmly mounted to the cross member and extending between the cross member and a longitudinal member, said crash box having a cross-member-proximal first zone and a second cross-member-distal elastic attachment zone and being made of two half-shells connected to one another at least in the first zone; and
fastening means, extending through walls of the attachment zone and the longitudinal member, for securing the crash box to the longitudinal member by forcing the attachment zone against the wall of the longitudinal member, while the attachment zone undergoes locally an elastic or plastic deformation for realizing a self-centered disposition of the crash box in relation to the longitudinal member by allowing a transverse shift of the half-shells of the crash box transversely to a vehicle length axis, said walls of the attachment zone and the longitudinal member extending at a tolerance distance relative to one another before the crash box is secured to the longitudinal member, wherein the wall of the attachment zone has length slots to thereby provide the wall with elastic or plastic deformation capability.

2. The bumper structure of claim 1, wherein the attachment zone is disposed in surrounding relationship to the longitudinal member.

3. A bumper structure for a motor vehicle, comprising:
a cross member
a crash box firmly mounted to the cross member and extending between the cross member and a longitudinal member, said crash box having a cross-member-proximal first zone and a second cross-member-distal elastic attachment zone and being made of two half-shells connected to one another at least in the first zone; and
fastening means, extending through walls of the attachment zone and the longitudinal member for securing the crash box to the longitudinal member by forcing the attachment zone against the wall of the longitudinal member, while the attachment zone undergoes locally an elastic or plastic deformation for realizing a self-centered disposition of the crash box in relation to the longitudinal member by allowing a transverse shift of the half-shells of the crash box transversely to a vehicle length axis, said walls of the attachment zone and the longitudinal member extending at a tolerance distance relative to one another before the crash box is secured to the longitudinal member,
wherein the half-shells of the crash box have marginal webs which are connected to one another to define first flanges and which form part of the attachment zone, said longitudinal member comprised of two half-shells which have marginal webs connected to one another to define second flanges, said webs of the crash box extending at a distance to one another in the attachment zone and surrounding the second flanges at a distance corresponding to the tolerance distance.

4. A bumper structure, for a motor vehicle, comprising:
a cross member;
a crash box firmly mounted to the cross member and extending between the cross member and a longitudinal member, said crash box having a cross-member-proximal first zone and a second cross-member-distal elastic attachment zone and being made of two half-shells connected to one another at least in the first zone; and
fastening means, extending through walls of the attachment zone and the longitudinal member, for securing the crash box to the longitudinal member by forcing the attachment zone against the wall of the longitudinal member, while the attachment zone undergoes locally an elastic or plastic deformation for realizing a self-centered disposition of the crash box in relation to the longitudinal member by allowing a transverse shift of the half-shells of the crash box transversely to a vehicle length axis, said walls of the attachment zone and the longitudinal member extending at a tolerance distance relative to one another before the crash box is secured to the longitudinal member,
wherein the attachment zone is constructed for placement into the longitudinal member.

5. A bumper structure for a motor vehicle, comprising:
a cross member;
a crash box firmly mounted to the cross member and extending between the cross member and a longitudinal member, said crash box having a cross-member-proximal first zone and a second cross-member-distal elastic attachment zone and being made of two half-shells connected to one another at least in the first zone; and
fastening means, extending through walls of the attachment zone and the longitudinal member, for securing the crash box to the longitudinal member by forcing the attachment zone against the wall of the longitudinal member, while the attachment zone undergoes locally an elastic or plastic deformation for realizing a self-centered disposition of the crash box in relation to the longitudinal member by allowing a transverse shift of the half-shells of the crash box transversely to a vehicle length axis, said walls of the attachment zone and the longitudinal member extending at a tolerance distance relative to one another before the crash box is secured to the longitudinal member,
wherein the cross member has a hat-shaped cross section with a center plate which is recessed in a direction of the crash box and terminates in angled legs, said half-shells of the crash box having marginal webs which are connected to one another to define flanges for connection to the legs.

6. The bumper structure of claim 1, wherein the tolerance distance is greater than a wall thickness of the attachment zone.

7. The bumper structure of claim 1, wherein the fastening means includes a bolt.

8. The bumper structure of claim 5, wherein the crash box has a center part defined by a vertical height which increases in a direction of the longitudinal member and tapers trapezoidally in a direction of the cross member so that the center part is supported only by the center plate of the cross member.

9. The bumper structure of claim 8, wherein the center part has a box-shaped configuration.

10. The bumper structure of claim 8, wherein the flanges of the crash box have ends extending beyond the center part of the crash box for abutment against the legs of the cross member.

11. The bumper structure of claim 10, wherein the ends are configured to conform to a rear contour of the cross member.

12. The bumper structure of claim 10, wherein the ends are configured to conform to a contour in a transition zone between the center plate and the legs.

13. The bumper structure of claim 10, wherein the ends are welded to the legs.

14. The bumper structure of claim 8, wherein the flanges of the crash box widen in a direction of the cross member as a height of the center part decreases, and reach a maximum in an area of the center plate of the cross member.

15. The bumper structure of claim 1, wherein the half-shells of the crash box have marginal webs which are spaced from one another at a distance in the attachment zone.

16. The bumper structure of claim 15, wherein the marginal webs are configured to abut one another to form a flange, with a wedge-shaped transition zone extending between the flange and the attachment zone and expanding until reaching the distance between the marginal webs.

* * * * *